(12) United States Patent
Lee et al.

(10) Patent No.: US 12,304,324 B2
(45) Date of Patent: May 20, 2025

(54) POWER SUPPLY DEVICE SYSTEM FOR A HYBRID OR ELECTRIC VEHICLE

(71) Applicant: FORD GLOBAL TECHNOLOGIES, LLC, Dearborn, MI (US)

(72) Inventors: Moon Young Lee, Livonia, MI (US); Baoming Ge, Okemos, MI (US); Fan Wang, Novi, MI (US); John P. Casci, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 17/867,289

(22) Filed: Jul. 18, 2022

(65) Prior Publication Data

US 2024/0017620 A1   Jan. 18, 2024

(51) Int. Cl.
| | |
|---|---|
| *B60L 3/00* | (2019.01) |
| *B60W 10/08* | (2006.01) |
| *H02K 11/25* | (2016.01) |
| *H02M 1/32* | (2007.01) |

(52) U.S. Cl.
CPC ........... *B60L 3/0061* (2013.01); *B60W 10/08* (2013.01); *H02K 11/25* (2016.01); *H02M 1/327* (2021.05); *B60L 2210/14* (2013.01); *B60L 2240/425* (2013.01)

(58) Field of Classification Search
None
See application file for complete search history.

(56) References Cited

U.S. PATENT DOCUMENTS

| | | | |
|---|---|---|---|
| 2015/0137926 A1 | 5/2015 | Yoshikawa | |
| 2019/0057810 A1 | 2/2019 | Shitama et al. | |
| 2019/0111909 A1* | 4/2019 | Shimizu | B60W 30/1843 |
| 2020/0044516 A1 | 2/2020 | Dunn | |
| 2020/0126716 A1* | 4/2020 | Yoshikawa | H01F 27/29 |

* cited by examiner

*Primary Examiner* — Todd Melton
*Assistant Examiner* — Jason R Roberson
(74) *Attorney, Agent, or Firm* — David B Kelley; Brooks Kushman P.C.

(57) ABSTRACT

A boost converter for a hybrid vehicle includes an inductor, a bus bar, an insulator, a temperature sensor, and a wire. The bus bar is configured to connect the inductor to a power source. The insulator is disposed over the bus bar and defines an array of orifices. The temperature sensor is configured to measure a temperature of the inductor. The wire is connected to the temperature sensor. The wire is weaved through the array of orifices such that the wire positionally alternates between opposing external sides of the insulator.

20 Claims, 4 Drawing Sheets

POWER SUPPLY DEVICE SYSTEM FOR A HYBRID OR ELECTRIC VEHICLE

TECHNICAL FIELD

The present disclosure relates to hybrid/electric vehicles and power supply devices for hybrid/electric vehicles.

BACKGROUND

Electric and hybrid vehicles may include power supply devices that are configured to convert electrical power from direct current (DC) into alternating current (AC) and/or vice versa.

SUMMARY

A vehicle includes an electric machine, a battery, an electrical circuit, a boost converter, a bus bar, an insulator, a thermistor, and a wire. The electric machine is configured to propel the vehicle. The electrical circuit is configured to convert direct current power from the battery into alternating current power and to deliver the alternating current power to the electric machine. The boost converter has an inductor and is configured to increase the battery voltage being input into the electrical circuit. The bus bar is configured to connect the inductor to the battery. The insulator is overmolded over a portion of the bus bar and defines an array of orifices. The thermistor is configured to measure a temperature of the inductor. The wire is configured to communicate the temperature of the inductor from the thermistor to a controller. The wire is weaved through the array of orifices and between opposing external surfaces of the insulator.

A boost converter for a hybrid vehicle includes an inductor, a bus bar, an insulator, a temperature sensor, and a wire. The bus bar is configured to connect the inductor to a power source. The insulator is disposed over the bus bar and defines an array of orifices. The temperature sensor is configured to measure a temperature of the inductor. The wire is connected to the temperature sensor. The wire is weaved through the array of orifices such that the wire positionally alternates between opposing external sides of the insulator.

A boost converter for a hybrid vehicle includes an inductor, a bus, a cover, and a wire. The bus is configured to connect the inductor to a power source. The cover is disposed over the bus and defines an array of orifices. The wire is configured to connect a temperature sensor to a controller. The wire weaves through the array of orifices such that the wire winds between opposing external sides of the cover.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
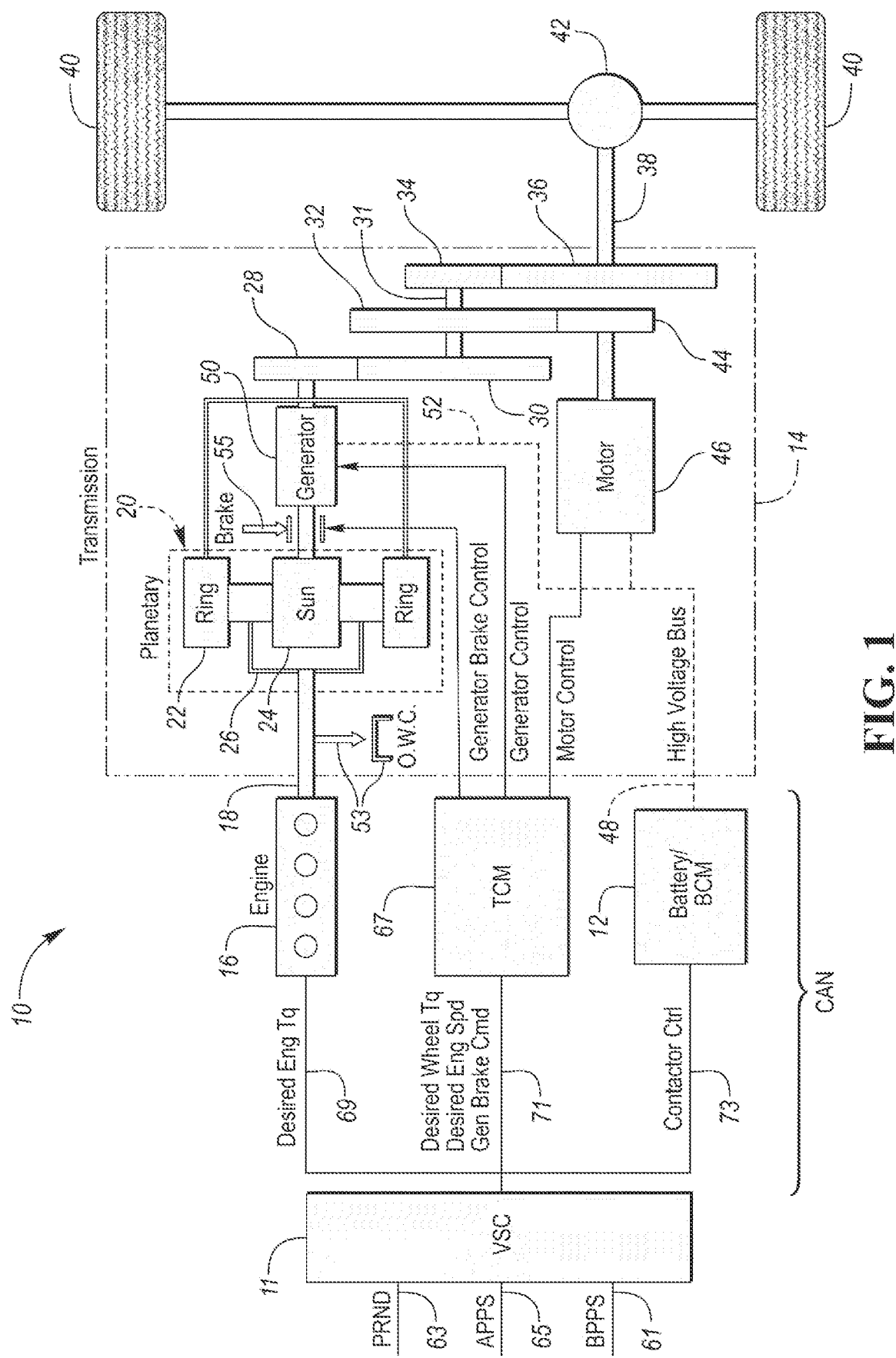
FIG. 1 is a schematic illustration of a representative powertrain of a hybrid electric vehicle.

Referring now to FIG. 1, a hybrid electric vehicle 10 having a powersplit powertrain is illustrated. The powertrain includes two power sources that are connected to the driveline: (1) an engine 16 and an electric machine 50 (which may be referred to as a generator) connected together via a planetary gear arrangement 20; and (2) an electric drive system including a battery 12 having a battery control module (BCM), an electric machine 46 (which may be referred to as a motor) and a generator 50. Battery 12 is an energy storage system for motor 46 and generator 50.

A vehicle system controller (VSC) 11 is configured to send control signals to and receive sensory feedback information from one or more of battery 12, engine 16, motor 46, and generator 50 in order for power to be provided to vehicle traction wheels 40 for propelling the vehicle 10. Controller 11 controls the power source proportioning between battery 12 and engine 16 for providing power to propel the vehicle 10 and thereby controls the state of charge (SOC) of battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is drivably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. Battery 12 delivers electric power to motor 46 through power flow path 48. Generator 50 is connected electrically to battery 12 and to motor 46 through power flow path 52. The power flow paths 48 and 52 may include inverting circuitry to convert direct current power from the battery 12 into alternating current power, which may then be delivered to the motor 46 or generator 50 to increase the power output of the powertrain. The power flow paths 48 and 52 may also include rectifying circuitry to convert alternating current power from either the motor 46 or the generator 50 into direct current power, which may then be delivered to the battery 12 to recharge the battery 12, which may occur during regenerative braking or while the engine 16 is powering the generator 50.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 11 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 11 issues a desired engine torque request to engine 16, as shown at 69, which is dependent on accelerator pedal position sensor (APPS) output 65. A brake pedal position sensor (BPPS) distributes a wheel brake signal to controller 11, as shown at 61. A brake system control module (not shown) may issue to controller 11 a regenerative braking command based on information from the BPPS. TCM 67 issues a generator brake control signal to generator brake 55. TCM 67 also distributes a generator control signal to generator 50.

The controllers illustrated in FIG. 1 (i.e., VSC 11, BCM, and TCM 67) may be part of a larger control system and may be controlled by various other controllers throughout the vehicle 10. It should therefore be understood that the controllers and one or more other controllers can collectively be referred to as a "controller" that controls various actuators in response to signals from various sensors to control functions such as starting/stopping engine 16, operating the motor 46 to provide wheel torque, operating the generator to charge the battery 12, etc. The controllers may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controllers in controlling the vehicle 10.

It should be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
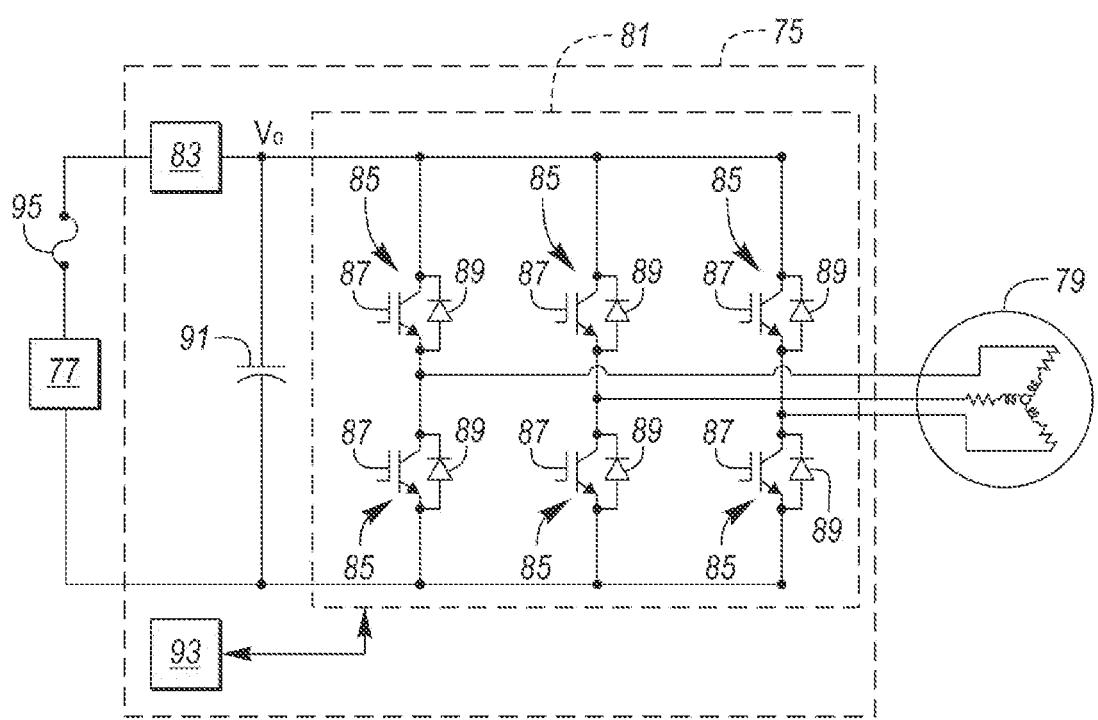
FIG. 2 is a circuit diagram of a power controller illustrating an inverter that is coupled to a DC power source and an electric machine.

Referring to FIG. 2, a circuit diagram of a power controller (or power supply device) 75 coupled to a power source 77 and an electric machine 79 is illustrated. The power source 77 may be the battery 12 and the electric machine 79 may be the motor 46 or generator 50 described in FIG. 1. The power controller 75 may be utilized in an electric drive system of the vehicle 10. The power source 77 may be coupled to the power controller 75 in order to drive the electric machine 79. The power controller 75 may include an inverter 81 and a voltage converter 83. The voltage converter 83 may be DC to DC boost converter, which is configured to increase the voltage of power source 77 being input into the inverter 81. The voltage converter 83 includes an inductor. The inverter 81 and the voltage converter 83 may be configured to deliver electrical power to the electric machine 79.

The inverter 81 includes inverting circuitry. The inverting circuitry may include switching units 85. The switching units 85 may each comprise a transistor 87, such as an insulated gate bipolar transistor (IGBT), in antiparallel with a diode 89. The switching units 85 may be configured to provide alternating current to the electric machine 79. More specifically, the inverter 81 may be configured to convert direct electrical current provided by the power source 77 into alternating electrical current, which is then delivered to the electric machine 79. The power controller 75 may include a linking capacitor 91. The linking capacitor 91 may be disposed between the power source 77 and the inverter 81. The linking capacitor 91 may be configured to absorb ripple currents generated at the inverter 81 or the power source 77, and stabilize the DC-link voltage, Vo, for inverter 81 control. Stated in other terms, the linking capacitor 91 may be arranged to limit voltage variation at an input of inverting circuitry due to ripple currents generated by the inverting circuitry or the power source 77. The power controller 75 may include a drive board 93 for controlling the inverting circuitry. The drive board 93 may be a gate drive board that is configured to operate the transistors 87 of the switching units 85 of the inverter 81 when converting the direct current of the power source 77 into alternating current and delivering the alternating current to the electric machine 79.

The voltage converter 83 may include an inductor. The circuitry of the voltage converter (not shown), including the inductor, may be configured to amplify or increase the voltage of the electrical power being delivered to the electric machine 79 from the power source 77. A fuse 95 may be disposed on the direct current side of the inverter 81 to protect the inverting circuitry from surges in electrical power.

The disclosure should not be construed as limited to the circuit diagram of FIG. 2, but should include power control devices that include other types inverters, capacitors, converters, or combinations thereof. For example, the inverter 81 may be an inverter that includes any number of switching units, the power controller 75 may include rectifying circuitry that converts the alternating current of the electric machine 79 into direct current to recharge the power source 77 (e.g., the generator 50 recharging the battery 12 during regenerative braking), and/or the linking capacitor 91 may be configured to couple one or a plurality of inverters to a power source.

A current inductor cooling strategy for hybrid vehicles includes splashing transmission fluid onto the inductor via the internal gears within the transmission. At times, however, this strategy may not provide sufficient cooling. This strategy makes the cooling capability largely dependent on the vehicle speed, which effectively cools the inductor at high vehicle speed, since the gears within the transmission will be splashing the transmission fluid at a high rotational speed. However, under low vehicle speeds, where the gears within the transmission will be splashing the transmission fluid at a low rotational speed, the transmission fluid may not reach the inductor or a reduced amount of transmission fluid may reach the inductor, resulting in a reduction in the cooling of the inductor.

Hybrid vehicles may operate at low vehicle speeds under conditions that require high inductor current, such as off-roading, towing, or supplying energy to high power auxiliary equipment (e.g., Autonomous Vehicles with A/C). Under such conditions, the current cooling strategy may be insufficient due to the reduced cooling at low vehicle speeds. High current conditions for long durations may inflict high thermal stress on the inductor. Without sufficient cooling, the inductor may reach its operating temperature limit under these conditions. Consequently, the control strategy of the hybrid vehicle may reduce the vehicle power output to prevent damaging the inductor. This reduction in power output may significantly reduce the performance of the hybrid vehicle. A solution to such a problem may include spraying pressurized transmission fluid from a nozzle onto targeted critical cooling surfaces of the inductor. Using pressurized transmission fluid at low vehicle speeds may be advantageous since bearings within the transmission may have less need for transmission fluid lubrication at lower speeds.

Figure 3:
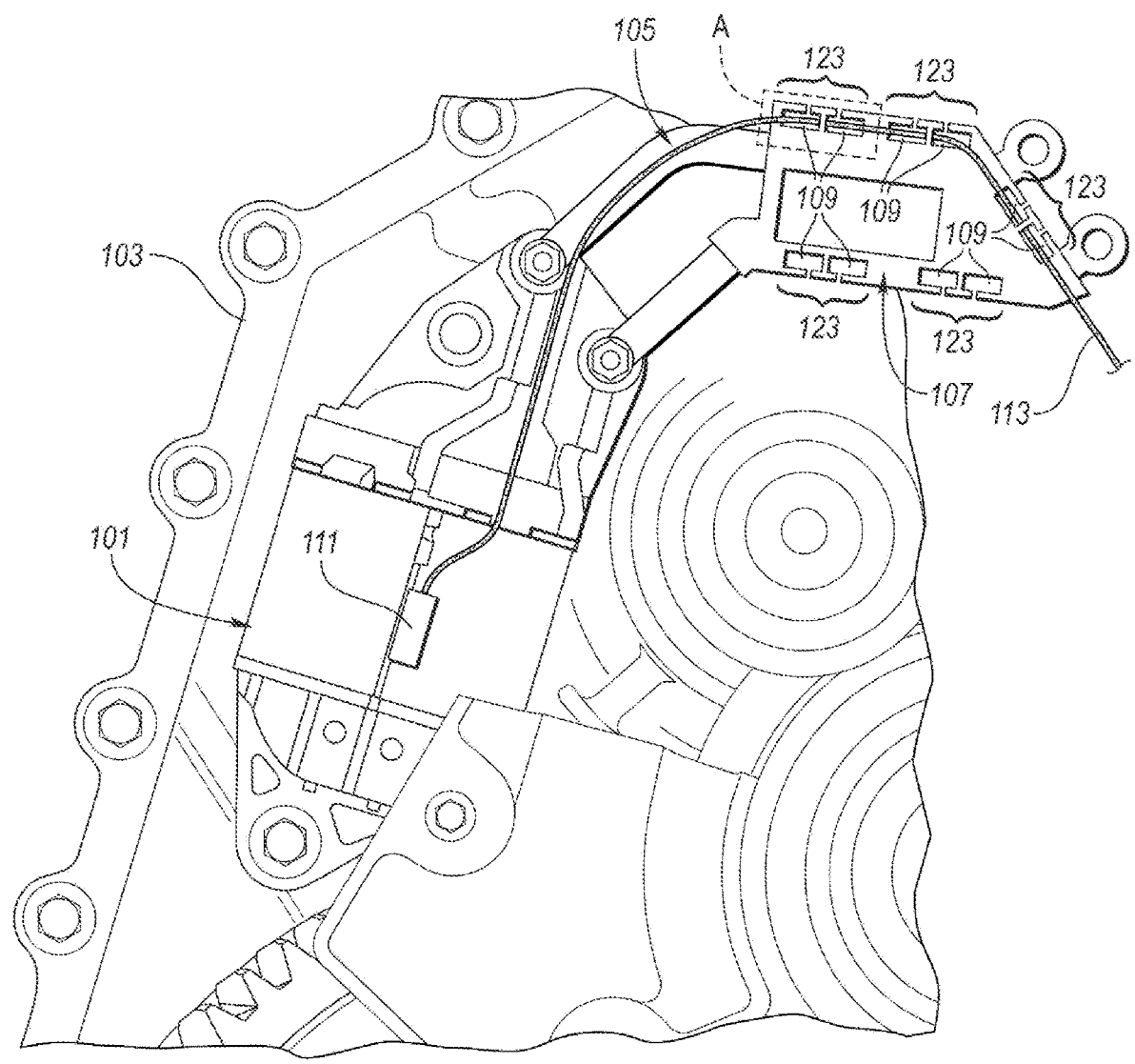
FIG. 3 is an inductor for a voltage converter, which may be a DC to DC boost converter for the hybrid powertrain system.
Figure 4:
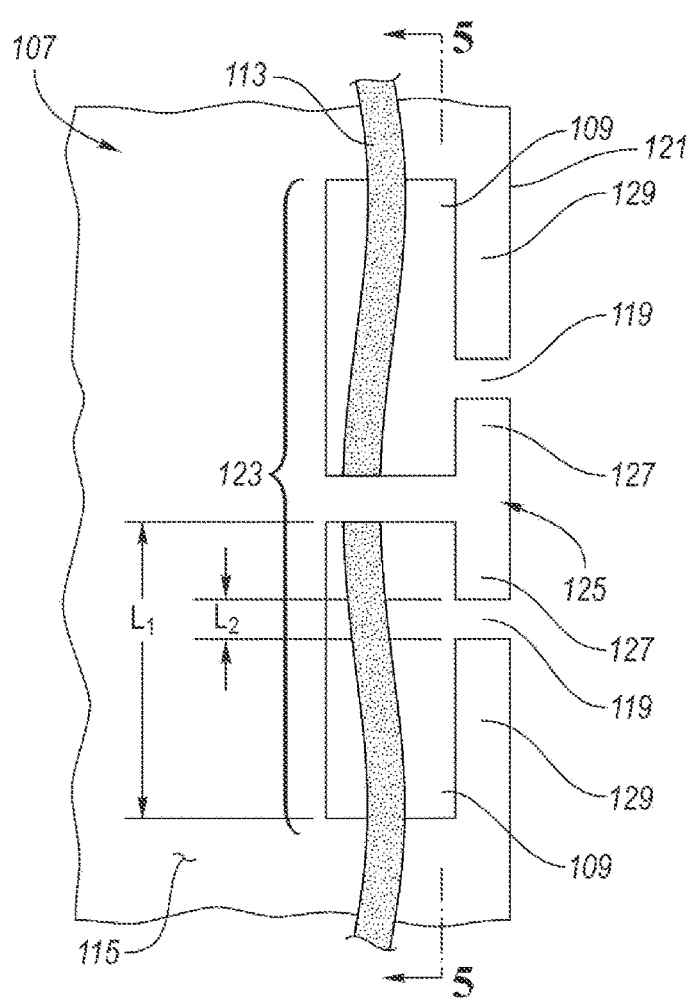
FIG. 4 is a magnified view of area A in FIG. 3.
Figure 5:
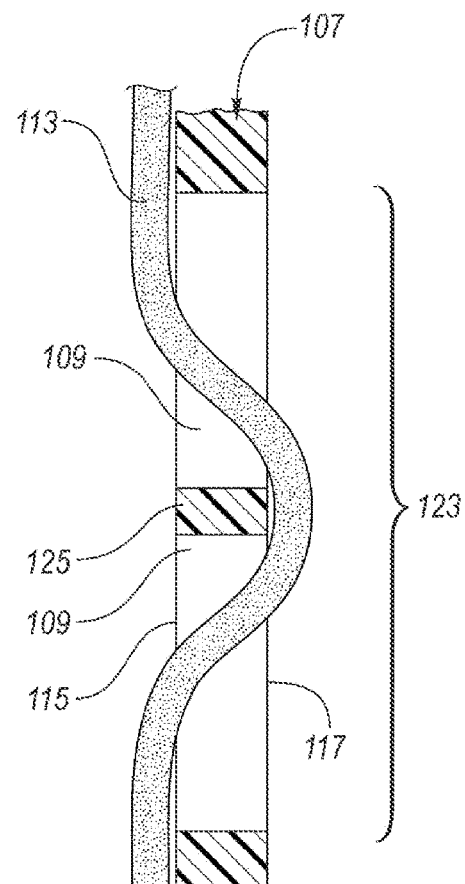
FIG. 5 is a cross-sectional view taken along line 5-5 in FIG. 4.

Referring to FIGS. 3-5, an inductor 101 for the voltage converter 83 and other various components of the voltage converter 83 are illustrated. In FIG. 3, the inductor 101 is illustrated as being disposed within a housing 103 of a transmission (e.g., transmission 14). In alternative embodiments, the hybrid electric vehicle 10 may include a step-ratio transmission and the inductor 101 may be disposed within the housing of the step-ratio transmission. An outer panel of the housing 103 has been removed in FIG. 3 for illustrative purposes. The inductor 101 may include a core, which may be made from iron. The core may also be magnetized. The inductor 101 may also include a coil or coil winding that is disposed about the core. One or more bobbin structures may be disposed between portions of the coil winding and the core.

A bus bar 105 is configured to connect the inductor 101 to a power source (e.g., power sources 77 or battery 12). A cover or insulator 107 may be disposed over the bus bar 105. More specifically, the insulator 107 may be disposed over a portion of the bus bar 105. The insulator may be a molded component that is secured to the bus bar 105 or may be overmolded onto the bus bar. The insulator 107 may be made from an insulating material such as a plastic or rubber while the bus bar 105 is made from a conductive material such as a conductive metal (e.g., copper). The insulator 107 may define an array of orifices 109.

A temperature sensor 111 is secured to and configured to measure a temperature of the inductor 101. The temperature sensor 111 may be a thermistor. A wire 113 is connected to the temperature sensor 111 and is configured to communicate the temperature of the inductor 101 from the temperature sensor 111 to a controller (e.g., VSC 11, BCM, and TCM 67). More specifically, the wire 113 may be configured to communicate a voltage of the temperature sensor 111, which varies with temperature, to the controller. The controller may include an algorithm that converts the voltage of the temperature sensor 111 to a temperature value. The wire 113 is weaved through the array of orifices 109 such that the wire positionally alternates between opposing external sides of the insulator 107. More specifically, the wire 113 is weaved through the array of orifices 109 such that the wire 113 winds between opposing external surfaces of the insulator 107. Such opposing external surfaces may refer to surface 115 and surface 117, which are disposed on opposite sides of the insulator 107 and face in opposite directions.

The insulator 107 further defines a plurality of gaps or slots 119. Each slot 119 extends from an external edge 121 of the insulator 107 to one of the orifices 109. The plurality of slots 119 facilitates insertion of the wire 113 into each orifice 109. Each orifice 109 and corresponding slot 119 may collectively form a T-slot. The orifices 109 may be arranged in pairs of orifices 123. The orifices 109 within each pair of orifices 123 are separated by an outwardly extending protrusion 125. The outwardly extending protrusion 125 may be T-shaped. Each outwardly extending protrusion 125 may partially define two of the slots 119. The pair of orifices 123 illustrated in FIGS. 4 and 5 may be representative of each of the pairs of orifices 123 depicted in FIG. 3.

Prongs 127 that extend form ends of each outwardly extending protrusion 125 and opposing prongs 129 operate to retain the wire 113 within each orifice 109. Prongs 129 form part of the insulator 107. Each Prong 129 partially defines one of the slots 119. The rigidity of the wire 113 may also operate to prevent the wire 113 from slipping out of the orifices 109 via the slots 119. The slots 119 may be tapered in directions extending toward correspond orifices 109 to allow for easy installing of the wire 113 into the orifices 109 via the slots 119 while also operating to prevent the wire 113 from slipping out of the orifices 109 via the slots 119 once installed. Each orifice 109 may have a first length $L_1$ extending along a length of the wire 113 while each slot 119 has a second length $L_2$ extending along the length the wire 113. The first length $L_1$ is greater than the second length $L_2$, which further operates to prevent the wire 113 from slipping out of the orifices 109 via the slots 119 once installed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to propel the vehicle;
   a battery;
   an electrical circuit configured to convert direct current power from the battery into alternating current power and to deliver the alternating current power to the electric machine;
   a boost converter having an inductor and configured to increase a battery voltage being input into the electrical circuit;
   a bus bar configured to connect the inductor to the battery;
   an insulator (i) overmolded over a portion of the bus bar and (ii) defining an array of orifices;
   a thermistor configured to measure a temperature of the inductor; and
   a wire configured to communicate the temperature of the inductor from the thermistor to a controller, wherein the wire is weaved (i) through the array of orifices and (ii) between opposing external surfaces of the insulator.

2. The vehicle of claim 1, wherein (i) the insulator further defines a plurality of slots, (ii) each slot extends from an external edge of the insulator to one of the orifices of the array of orifices, and (iii) the plurality of slots facilitates insertion of the wire into each orifice of the array of orifices.

3. The vehicle of claim 2, wherein each orifice of the array of orifices and a corresponding slot of the plurality of slots form a T-slot.

4. The vehicle of claim 2, wherein (i) the array of orifices is arranged in pairs of orifices and (ii) the orifices within each pair of orifices are separated by an outwardly extending protrusion.

5. The vehicle of claim 4, wherein each outwardly extending protrusion is T-shaped.

6. The vehicle of claim 4, wherein each outwardly extending protrusion partially defines two of the slots of the plurality of slots.

7. The vehicle of claim 2, wherein (i) each orifice of the array of orifices has a first length extending along a length of the wire, (ii) each slot of the plurality of slots has a second length extending along the length the wire, and (iii) the first length is greater than the second length.

8. A vehicle comprising:
a boost converter having:
an inductor,
a bus bar configured to connect the inductor to a power source,
an insulator (i) disposed over the bus bar and (ii) defining an array of orifices,
a temperature sensor configured to measure a temperature of the inductor, and
a wire connected to the temperature sensor, wherein the wire is weaved through the array of orifices such that the wire positionally alternates between opposing external sides of the insulator.

9. The vehicle of claim 8, wherein (i) the insulator further defines a plurality of slots, (ii) each slot extends from an external edge of the insulator to one of the orifices of the array of orifices, and (iii) the plurality of slots facilitates insertion of the wire into each orifice of the array of orifices.

10. The vehicle of claim 9, wherein each orifice of the array of orifices and a corresponding slot of the plurality of slots form a T-slot.

11. The vehicle of claim 9, wherein (i) the array of orifices is arranged in pairs of orifices and (ii) the orifices within each pair of orifices are separated by an outwardly extending protrusion.

12. The vehicle of claim 11, wherein each outwardly extending protrusion is T-shaped.

13. The vehicle of claim 11, wherein each outwardly extending protrusion partially defines two of the slots of the plurality of slots.

14. The vehicle of claim 9, wherein (i) each orifice of the array of orifices has a first length extending along a length of the wire, (ii) each slot of the plurality of slots has a second length extending along the length the wire, and (iii) the first length is greater than the second length.

15. A vehicle comprising:
a boost converter having:
an inductor,
a bus configured to connect the inductor to a power source,
a cover (i) disposed over the bus and (ii) defining an array of; orifices, and
a wire configured to connect a temperature sensor to a controller, wherein the wire weaves through the array of orifices such that the wire winds between opposing external sides of the cover.

16. The vehicle of claim 15, wherein (i) the cover further defines a plurality of slots, (ii) each slot extends from an external edge of the cover to one of the orifices of the array of orifices, and (iii) the plurality of slots facilitates insertion of the wire into each orifice of the array of orifices.

17. The vehicle of claim 16, wherein each orifice of the array of orifices and a corresponding slot of the plurality of slots form a T-slot.

18. The vehicle of claim 16, wherein (i) the array of orifices is arranged in pairs of orifices and (ii) the orifices within each pair of orifices are separated by an outwardly extending protrusion.

19. The vehicle of claim 18, wherein each outwardly extending protrusion is T-shaped.

20. The vehicle of claim 18, wherein each outwardly extending protrusion partially defines two of the slots of the plurality of slots.

* * * * *